United States Patent [19]

Redford

[11] Patent Number: 5,444,235
[45] Date of Patent: Aug. 22, 1995

[54] SCANNING LIGHT VALVE SENSOR SYSTEM EMPLOYING FIBER OPTICS

[75] Inventor: Gary R. Redford, Tucson, Ariz.

[73] Assignee: Hughes Aircraft Company, Los Angeles, Calif.

[21] Appl. No.: 160,130

[22] Filed: Dec. 2, 1993

[51] Int. Cl.$^6$ ............................................. H01J 3/14
[52] U.S. Cl. .................. 250/208.1; 250/216; 250/227.20
[58] Field of Search ............. 250/208.1, 216, 234–236, 250/227.20; 358/505, 509

[56] References Cited

U.S. PATENT DOCUMENTS

| | | | |
|---|---|---|---|
| 4,383,170 | 5/1983 | Takagi et al. | 250/216 |
| 5,256,868 | 10/1993 | Kaplan et al. | 250/227.20 |
| 5,266,795 | 11/1993 | Vaughan | 250/227.20 |

*Primary Examiner*—Stephone B. Allen
*Attorney, Agent, or Firm*—R. M. Heald; C. D. Brown; W. K. Denson-Low

[57] ABSTRACT

A sensor system includes a sensor having a planar array of sensor elements, each of which produces an output responsive to an energy input. The sensed energy reaching the sensor elements is controlled by at least two, and preferably a plurality of, light valves. A controller selects one of the light valves at a time to transmit energy of a scene segment impinging upon the light valve. An optical fiber bundle includes an optical fiber cable for each light valve extending from the sensor to the respective light valve. Each optical fiber cable has an optical fiber for each element of the sensor array. Preferably, each light valve is divided into a plurality of pixels, arranged such that the optical fibers of each optical fiber cable map the energy impinging upon each pixel of one of the light valves to a corresponding respective planar sensor element of the sensor array. A lens focuses a scene onto the light valves, such that a segment of the scene is imaged onto each of the light valves.

19 Claims, 2 Drawing Sheets

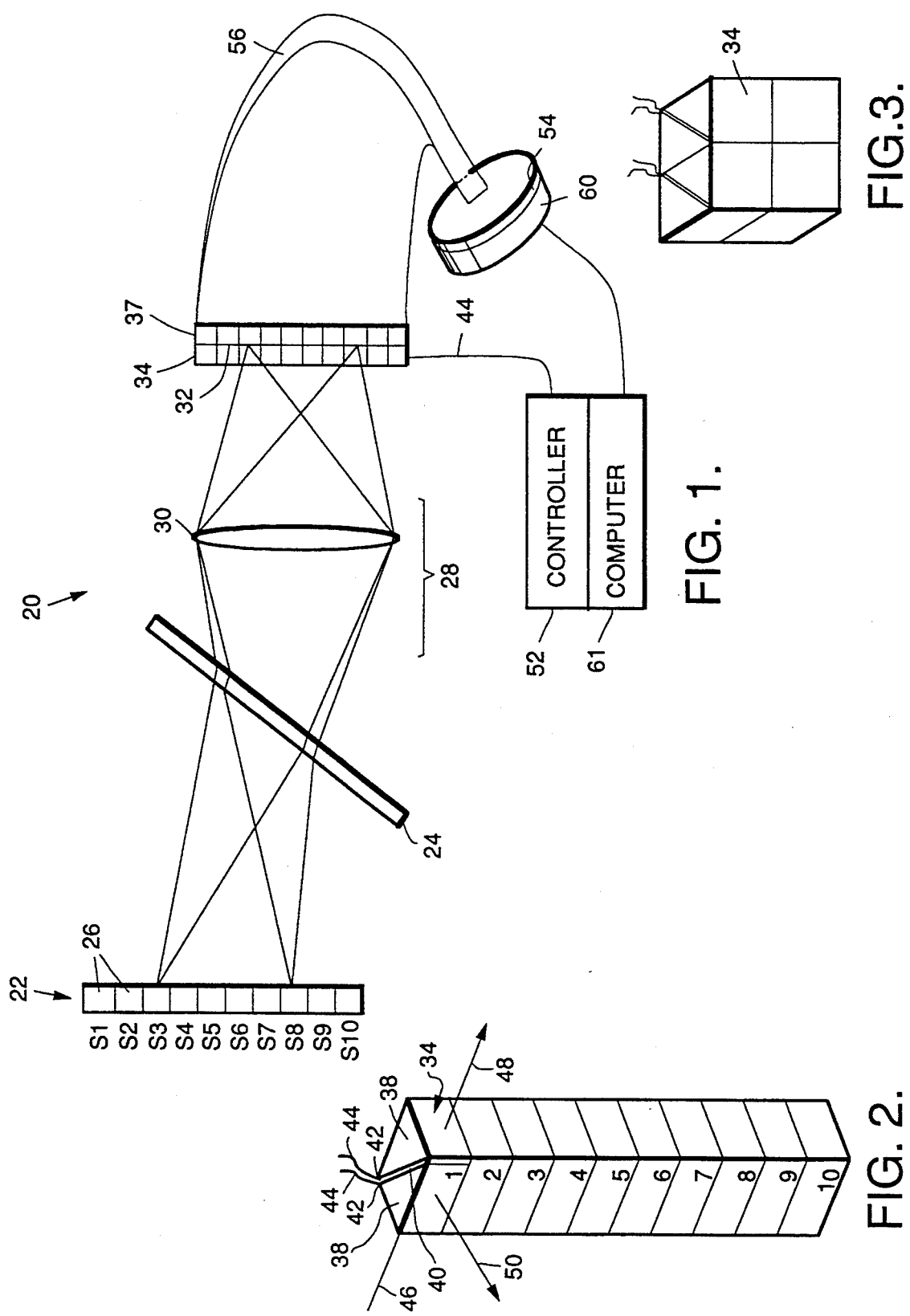

SCANNING LIGHT VALVE SENSOR SYSTEM EMPLOYING FIBER OPTICS

BACKGROUND OF THE INVENTION

This invention relates to sensor systems for viewing scenes, and, more particularly, such a sensor system that achieves a high resolution over a large area, with no moving parts in the system.

As used herein, a sensor system is a device that converts an image into a signal which may be further analyzed. The sensor system typically includes a sensor device and an optical system that images a scene onto the sensor device. The visible or non-visible energy radiated from a scene is imaged onto the sensor by the optical system. The sensor converts the energy of the imaged scene into electrical signals. These signals are displayed, stored, or processed by a computer to analyze the content of the scene.

A television camera is one type of sensor system that converts visible light to an electrical signal. In other applications, lighter, smaller sensor systems, such as those employing a planar sensor array, are used. Such a planar array sensor has a large number of individual sensor elements that each receive energy and produce a responsive electrical output signal. The type of energy to which the sensor responds is determined by the detailed structure of the sensor element. Sensor elements are available for a wide range of visible light, infrared, and other wavelengths of energy. The sensor elements are provided in a large array, which in some current approaches is 256×256 elements in size, but may be larger or smaller. Thus, the planar sensor array may have tens of thousands of individual sensor elements. An optical system is typically provided to focus a scene onto the planar sensor array.

The resolution of a sensor system, including a planar sensor array coupled with an optical system, is measured by the angular size of an object that is subtended by a sensor element. The smaller the angle that may be resolved, the higher the resolution of the sensor. For any one sensor element, it is usually the case that the greater the resolution, the smaller the field of view of the sensor.

To increase the field of view of the sensor system without a loss of resolution, a sensor system may be constructed to view a small angular scene. The sensor array is mounted on a gimballed support driven by a controllable motor. The gimbal is driven to scan across a larger scene, so that the sensor array views only a small portion of the scene at any moment. A complete, high resolution image of the entire scene can be constructed by storing the images taken as the sensor array is scanned.

The gimballed sensor array approach is widely used. In some instances it may not be acceptable, because the gimbal and drive system are heavy, or because the mechanical system cannot withstand high acceleration environments. In other instances, the time required to complete a scanning of the scene is too long. There therefore exists a need for an improved approach to a high-resolution, large-scene sensor, which does not require any moving parts such as a gimbal and drive system. The present invention fulfills this need, and further provides related advantages.

SUMMARY OF THE INVENTION

The sensor system of the invention produces a high-resolution image of a large scene, with a resolution determined by a small subtended angle of the sensor. There are no moving parts. As a result, the sensor system is light and suitable for use in high-acceleration or other applications that may be difficult or impossible for sensors requiring moving parts. The image of the scene is more rapidly generated than could a comparable image for a sensor system utilizing a gimbal mount.

In accordance with the invention, a sensor system comprises sensor means for producing an output responsive to an energy input, means for dividing a scene into at least two scene segments, each scene segment comprising a portion of the scene, and means for controllably directing one scene segment at a time to the sensor means.

More specifically in relation to one embodiment, a sensor system comprises sensor means for sensing, a signal, the sensor means comprising an array of sensor elements, each of which produces an output responsive to an energy input. The system includes light valve means for controllably selecting a scene segment from a scene focused onto the light valve means to be transmitted to the sensor meats. Light transmission means conducts the image energy of a selected scene segment from the light valve means to the sensor means, and optical means focuses the scene onto the light valve means.

In the preferred approach of the invention, a lens focuses a scene onto a multipart light valve, preferable formed of a plurality of independently operated liquid crystal light valves. A segment or portion of the scene is focused onto each of the light valves, so that the light valves collectively act as a switch to determine which segment of the scene reaches the sensor. By permitting one, but only one, of the light valves to transmit while the others reflect the impinging energy, the light valve controller selects the segment of the scene to be viewed.

The segment to be viewed is transmitted to the planar array sensor by an optical fiber cable of optical fibers that extends to each of the light valves. There is an optical fiber cable for each of the light valves. If the light valve is viewed as a spatial pixel array, then the optical fiber cable maps the pixel intensities of the light valve into the individual sensor elements of the sensor array. Preferably, the number of optical fibers in each optical fiber cable is equal to the number of sensor elements of the sensor array, which in turn is equal to the number and arrangement of pixels in the spatial array of each light valve.

Thus, in an example, if there are N=10 light valves, the optical fiber bundle has N=10 optical fiber cables. If the sensor is formed as an (X,Y)=(256×256) array of sensor elements, then each of the light valves is organized as a (X,Y)=(256×256) array of pixels, with an optical fiber extending from each of the pixels of the light valve to each of the sensor elements. In this example, there would be 65,536 optical fibers in each optical fiber cable, and 10 optical fiber cables. Applying a planar grid system to each of the N light valves, the (x,y) pixel of each light valve would preferably be mapped to the (x,y) sensor element of the sensor array. Thus, there would be N optical fibers feeding their signals to each of the sensor elements, bat only one would be active at any moment according to the control approach discussed above.

The present sensor system achieves a high resolution, because the sensor must receive and respond to only one of the images transmitted by the light valves at a time. As many light valves as necessary, arranged in a one-dimensional or two-dimensional array, may be utilized in order to divide the scene into the number of segments required to achieve the desired resolution. Of course, the more light valves, the longer the time required to scan through all of the scene segments and the more data storage space required. The present system has no moving parts, and in a preferred embodiment can be produced in a small space and with a light weight.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a schematic depiction of the preferred sensor system;

FIG. 2 is a perspective view of a one-dimensional liquid crystal light valve array;

FIG. 3 is a perspective view of a two-dimensional liquid crystal light valve array;

DETAILED DESCRIPTION OF THE INVENTION

Figure 4:
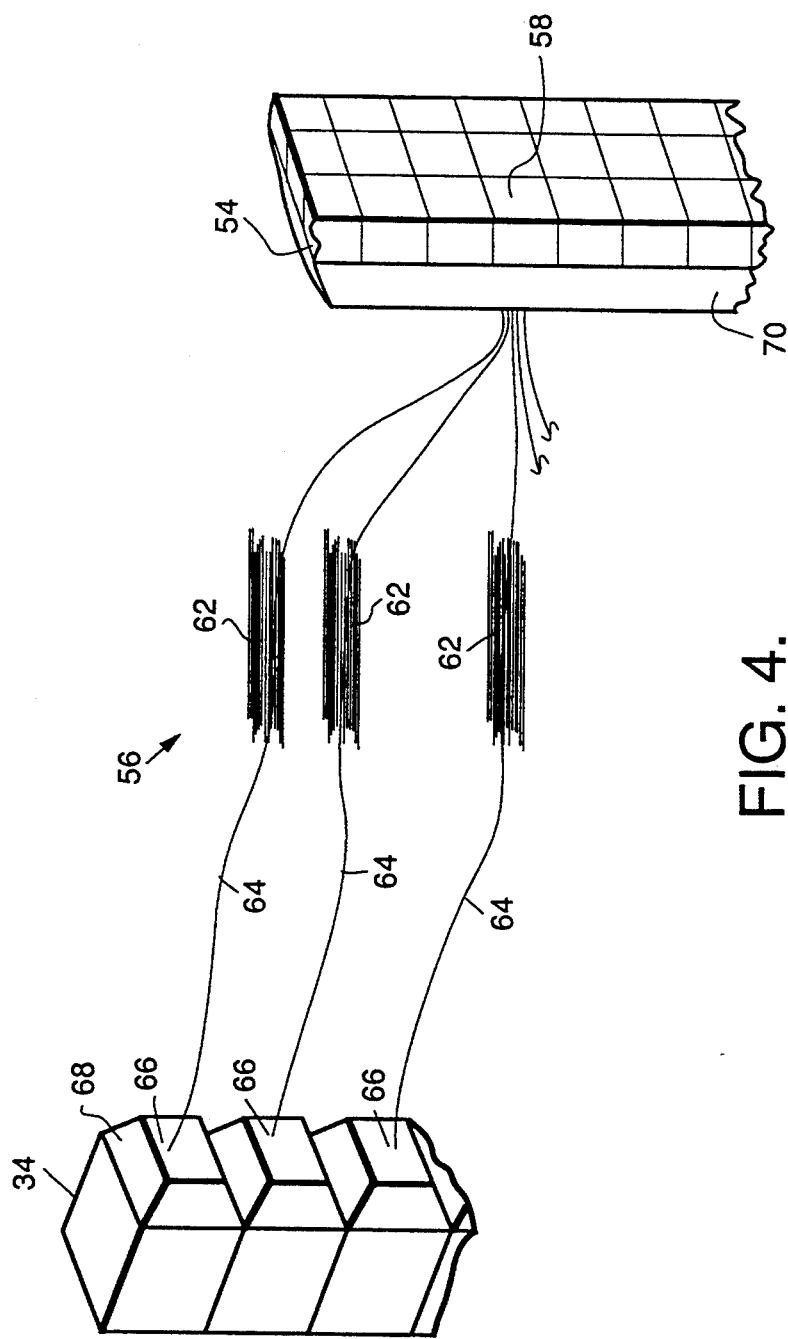
FIG. 4 schematic depiction of the interfacing of the light valve array to the optical fiber bundle to the sensor array.

FIG. 1 depicts a sensor system 20 according to the present approach. The sensor system 20 views a scene 22 through a window 24 that protects the sensor system 20. The scene 22 may be considered as being formed of a plurality of scene segments 26. There is not, of course, a physical division of the scene 22 into segments 26, but, as will be discussed, the optical elements of the sensor system 20 have the effect of dividing the image of the scene 22 into such a plurality of segments 26.

The sensor system 20 includes an optical system 28, illustrated schematically by a single lens 30, that focuses the scene 22 onto a rear plane of a plurality of light valves 34, in this case arranged in a one-dimensional array. The optical system 28 may also include other optical elements, such as a convex spherical correction lens that corrects for spherical aberration and other irregularities of the image.

FIG. 1 traces the light ray paths from two of the scene segments S3 and S8. The optical system 28 focuses these scene segments S3 and S8 onto different ones of the light valves 34. Thus, each light valve 34 may be considered as viewing a segment 26 of the scene 22, but not the other segments of the scene.

FIG. 2 depicts the plurality of light valves 34, in a one-dimensional array. Each of the plurality of light valves 34 is Formed as a pair of triangular prisms 38 with the hypotenuse of each prism facing the other prism. A liquid crystal layer 40 with a transparent electrode 42 on each side of the layer 40 is sandwiched between the prisms 38. Electrical leads 44 extend to the electrodes 42. Light valve structures of this type are known in the art for other applications. In a preferred embodiment, the prisms 38 are formed of zinc selenide (ZnSe), the liquid crystal is any liquid crystal material that is transparent when no voltage is applied to the electrodes, and the electrodes are transparent indium-tin-oxide layers each about 30 micrometers thick.

When no electrical potential is applied between the leads 44, the liquid crystal layer 40 is transparent and an incoming light ray 46 passes through light valve 34 as transmitted ray 48. When a sufficient electrical potential is applied between the leads 14, the liquid crystal layer 40 becomes opaque and the incoming light ray 46 is reflected by the layer 40 and is deflected as the reflected light ray 50. (Equivalently for the present purposes, other liquid crystals can be used that are opaque when not energized and are transmissive when energized, and in that case the voltage procedures are reversed.)

Each of the plurality of light valves 34 is energized independently of the others, by a controller 52 (FIG. 1). In operation of the sensor system 20, at any moment exactly one of the light valves 94 is not energized, so that its incoming light ray is transmitted through the light valve. All of the other light valves 34 are energized, so that their incoming light rays are reflected away. By selecting the light valve 94 that is not to be energized at any moment, the light valve array can be used to select any of the scene segments 26 for viewing. The entire scene 22 can be viewed as a sequence of individual segments 26 by utilizing the controller 52 to scan through the light valves 34 one after the other.

FIG. 1 shows a one-dimensional array of light valves 34. A two-dimensional array of light valves 34 may also be employed, as shown in FIG. 3.

The image of the selected segment 26 is transmitted to a planar sensor 54 by an optical B fiber bundle 56 in optical communication with the array of light valves 34 at a connector 37. The planar sensor 54 is preferably a focal plane array (FPSA) sensor formed of a plurality of individual sensor elements 58, as shown in FIG. 4. The sensor elements 58 are normally arranged in a two-dimensional array, such as $256 \times 256$ element array.

The planar sensor 54 may be of any type operable at the wavelength of the energy from the scene 22 that is to be used to image the scene. In a typical case, the sensor 54 is an InSSe sensor to image in the infrared range, which is known in the art for other applications. Such a sensor 54 is usually cooled to cryogenic temperature to improve its efficiency of operation and sensitivity, and is attached to a dewar 60 that cools the sensor 54 in operation. Each of the sensor elements 58 produces an output signal that is provided to, and processed by, a computer 61. The computer 51, typically a dedicated microprocessor, also controls and integrates the operation of the light valve controller 52.

FIG. 4 illustrates the manner of directing the appropriate image from the light valve 94 to the individual sensor element 58. The optical fiber bundle 56 is composed of a plurality of optical fiber cables 62. The plurality of optical fiber cables 62 is preferably equal in number to the plurality of light valves 34. (Only three of the light valves 34 and three of the optical fiber cables 62 are shown in FIG. 4.)

Each of the optical fiber cables 62 includes a plurality of optical fibers 64. In the preferred approach, the number of optical fibers 64 in each of the optical fiber cables 62 is equal in number to the number of sensor elements 58. For example, in the case of the $256 \times 256$ array of sensor elements 58, there are 65,595 optical fibers 64 in each of the optical fiber cables 62.

The light valves 24 may be considered to be divided into a plurality of pixels 66. Preferably, the pixel array of the light valve 94 is the same numerical size (X,Y) as the array of sensor elements 58. That is, if the sensor elements 58 are arranged in a 256×255 array, the pixels 66 of the light valve 34 are also arranged in a 256×256 array.

In this preferred approach wherein the numerical stray sizes of the arrays of pixels 66 and the sensor elements 58 are the same, the optical fiber 64 connects the corresponding pixel 66 and sensor element 58. Thus, one of the optical fibers extends from the pixel 66 located at (x,y) of the pixel array of the first of the light valves 34 to the sensor element 58 located at (x,y) of the sensor element array, as part of the first optical fiber cable 62. Another optical fiber 64 extends from the pixel 66 located at (x,y) of the pixel array of the second of the light valves 34 to the sensor element 58 located at (x,y) of the sensor element array, as part of the second optical fiber cable 62. This pattern repeats, until an optical fiber runs from the (x,y) pixel of each light valve 34 to the same sensor element 58 located at (x,y) of its array.

Figure 5:
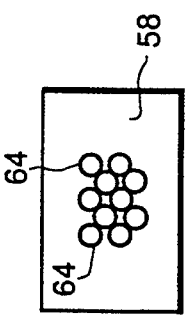
FIG. 5 is a plan view of the interface between the optical fiber bundle and the planar sensor array.

FIG. 5 shows the manner in which multiple optical fibers 64 feed their outputs into a single sensor element 58. The optical fibers 64 are preferably made sufficiently smaller in size than the individual sensor elements 53 so that multiple optical fibers 64 can be placed into a facing relation with the single sensor element 58. In a typical case, each optical fiber 64 has a diameter of about 125 micrometers, while the sensor element 58 is square in plan view with a side of about 400 micrometers or less. There is easily sufficient room to mount 10 or more optical fibers 64 in a facing relationship with the single sensor element 58, as shown in FIG. 5.

The optical fiber 64 is attached to the rear plane 92 of the light valve 34 at one end by an optical fiber face plate 68, and at the other end to the front face of the planar sensor 54 by another optical fiber face plate 70. Such a face plate 68 or 70 can be obtained commercially, or made by casting an optical fiber potting compound around the ends of the optical fibers, and then cutting and polishing the facing end of the potting compound.

In operation, a particular light valve 34 is selected by the controller 52 for viewing of its scene segment 26. That selected scene segment is constantly imaged by the optical system 28 onto the rear plane 32 of the selected light valve 34. The selected scene segment is carried to the sensor 54 on a pixel-by-pixel to element-by-element basis, through the optical fibers 64. The resulting image is provided to the computer 61, which combines that information with the identity of the selected scene segment.

In a preferred application, a field of view of a 3 degree by 30 degree scene is required, with an angular resolution of 0.2 milliradians. A 256×256 focal plane sensor array is used. The light valve assembly is a one-dimensional array of 10 light valves 24, as shown in FIG. 2, each having a 3 degree by SS degree scene segment field of view. The entire 3 degree by 30 degree field of view of the scene is achieved by scanning through the 10 light valves 34. The sensor system has no moving parts.

Although a particular embodiment of the invention has been described in detail for purposes of illustration, various modifications may be made without departing from the spirit and scope of the invention. Accordingly, the invention Is not to be limited except as by the appended claims.

What is claimed is:

1. A sensor system, comprising:
sensor means for producing an output responsive to an energy input;
means for dividing a scene into at least two scene segments, each scene segment comprising a portion of the scene; and
means for controllably directing one scene segment at a time from the means for dividing to the sensor means the means for controllably directing including at least two optical fiber cables, one optical fiber cable extending from each scene segment to the sensor means, and wherein each optical fiber cable includes at least one optical fiber.

2. The sensor system of claim 1, wherein the means for controllably directing includes at least two controllable light valves.

3. The sensor system of claim 1, wherein the means for controllably directing includes at least two controllable liquid crystal light valves.

4. The sensor system of claim 1, wherein the means for dividing includes an optical system that focuses the scene onto the means for controllably directing such that different scene segments are focused onto various portions of the means for controllably directing.

5. The sensor system of claim 4, wherein the means for controllably directing controllably permits scene segments to be transmitted to the sensor means.

6. The sensor system of claim 1, wherein the sensor means includes an array of sensor elements.

7. The sensor system of claim 6, wherein each optical fiber cable comprises an optical fiber for each sensor element of the array of sensor elements.

8. The sensor system of claim 7, wherein the optical fibers of each optical fiber cable are arranged to map the energy impinging upon a scene segment to a sensor element of the sensor array.

9. A sensor system, comprising:
sensor means for sensing a signal, the sensor means comprising an array of sensor elements, each of which produces an output responsive to an energy input;
light valve means for controllably selecting a scene segment from a scene focused onto the light valve means to be transmitted to the sensor means, wherein the light valve means comprises at least two individually controllable light valves, one of which at a time may be selected to pass light impinging upon the light valve to the light transmission means, while the remaining light valves do not pass impinging light to the light transmission means;
light transmission means for conducting an image energy of a selected scene segment from the light valve means to the sensor means, the means for controllably directing including an optical fiber bundle having at least two optical fiber cables, one optical fiber cable extending from each light valve to the sensor means, and wherein each optical fiber cable comprises at least two optical fibers, the number of optical fibers in each cable being equal to the number of sensor elements of the array of sensor elements; and
optical means for focusing a scene onto the light valve means.

10. The sensor system of claim 9, wherein the sensor elements comprise a focal plane array arranged into an array of pixels.

11. The sensor systems of claim 9, wherein the optical means includes a lens.

12. The sensor system of claim 9, a controller that selects one of the light valves at a time to transmit energy of a scene segment impinging upon the light valve.

13. The sensor system of claim 9, wherein the optical fibers of each optical fiber cable are arranged to map the energy impinging upon a location of one of the light valves to a sensor element of the sensor array.

14. A sensor system, comprising:
  a sensor comprising a planar array of sensor elements, each of which produces an output responsive to an energy input;
  at least two light valves;
  a controller that selects one of the light valves at a time to transmit energy of a scene segment impinging upon the light valve;
  an optical fiber bundle comprising an optical fiber cable for each light valve extending from the sensor to the respective light valve, each optical fiber cable having an optical fiber for each element of the sensor array; and
  a lens that focuses a scene onto the light valves, such that a segment of the scene is imaged onto each of the light valves.

15. The sensor system of claim 14, wherein the optical fibers of each optical fiber cable are arranged to map the energy impinging upon a location of one of the light valves to a corresponding respective planar sensor element of the sensor array.

16. The sensor system of claim 14, wherein each light valve is divided into a plurality of pixels, and wherein the optical fibers of each optical fiber cable are arranged to map the energy impinging upon each pixel of one of the light valves to a corresponding respective planar sensor element of the sensor array.

17. The sensor system of claim 14, wherein the light valves are arranged in a one-dimensional array.

18. The sensor system of claim 14, wherein the light valves are arranged in a two-dimensional array.

19. The sensor system of claim 14, wherein the light valves are liquid crystal light valves.

* * * * *